June 23, 1925.  
P. COFRANCESCO ET AL  
1,543,320  
DOUBLE ROW BALL BEARING  
Filed Nov. 3, 1924

INVENTORS  
Peter Cofrancesco  
William F. Thiede  
BY  
Mitchell Brothers  
ATTORNEYS Patented June 23, 1925.

1,543,320

UNITED STATES PATENT OFFICE.

PETER COFRANCESCO AND WILLIAM P. THIEDE, OF NEW BRITAIN, CONNECTICUT, ASSIGNORS TO THE FAFNIR BEARING COMPANY, OF NEW BRITAIN, CONNECTICUT, A CORPORATION OF CONNECTICUT.

DOUBLE-ROW BALL BEARING.

Application filed November 3, 1924. Serial No. 747,450.

*To all whom it may concern:*

Be it known that we, PETER COFRANCESCO and WILLIAM P. THIEDE, citizens of the United States of America, residing at New Britain, Connecticut, have invented new and useful Improvements in a Double-Row Ball Bearing, of which the following is a specification.

This invention relates to improvements in ball bearings, the object being to provide ball bearings of the double row "unit handling" type with ball spacers of a simple, effective and durable form. The invention contemplates a quick, inexpensive and effective method of assembling the spacers for the respective rows of balls.

In the accompanying drawings—

1 is an outer bearing ring. 2 is an inner bearing ring. These rings are provided with two sets of complementary raceways for receiving two rows of balls 3—3ª, respectively. In order to properly space these balls suitable spacing means must be provided. To that end I form each spacer of a strip of sheet metal, circular in form, the metal being fluted so as to form a series of spaced ball-receiving pockets.

Figure 1:
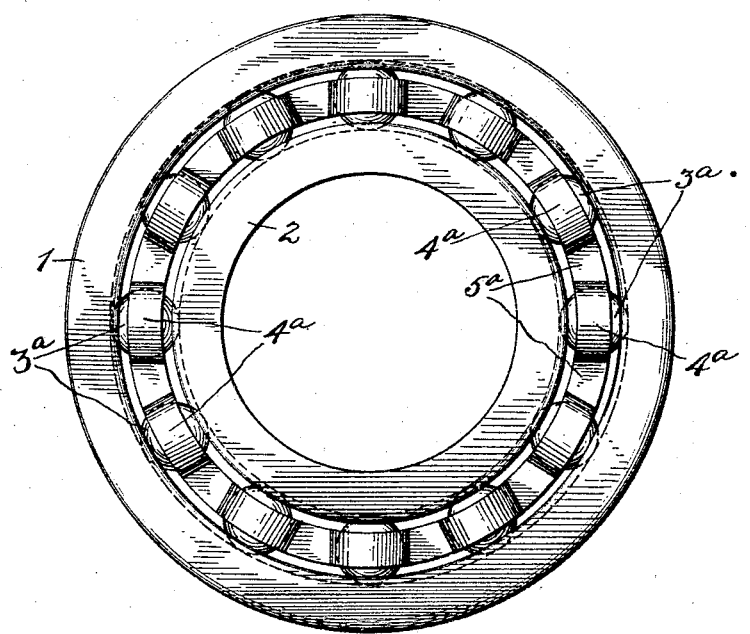
Fig. 1 is a side elevation of a double row ball bearing of the so called "unit handling" type, equipped with our improved spacers.
Figure 2:
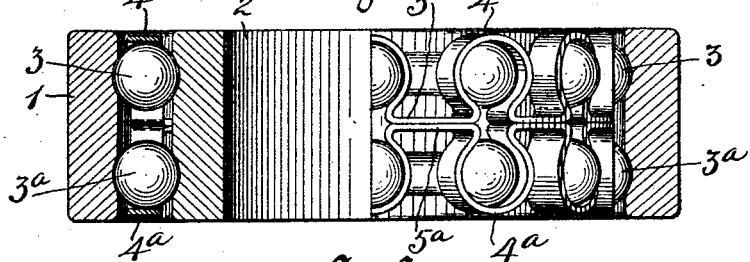
Fig. 2 is a section thereof, showing the completed bearing.
Figure 3:
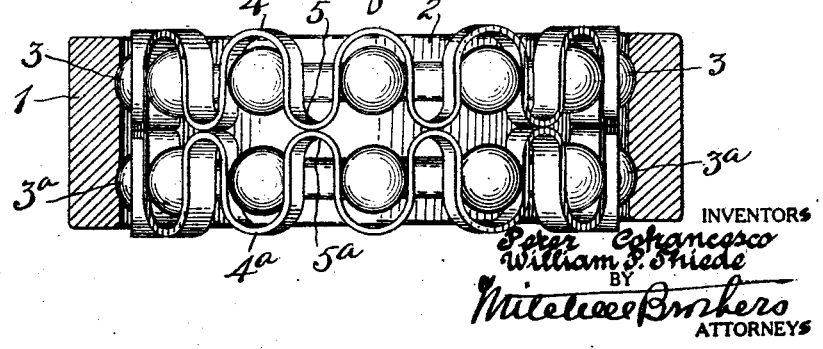
Fig. 3 is a similar view illustrating the spacers in place to receive the final assembling operation.

The shape of each spacer, preparatory to being assembled, is best seen in Fig. 3. In this figure the outer parts 4—4ª are arched and overstand the balls 3—3ª of the respective sets. The intermediate inner parts 5—5ª are reversely arched so that, in the first act of assembling, they may be slipped freely between adjacent balls to space the same as shown in Fig. 3 with the parts 5—5ª confronting each other. To secure the spacers in place pressure is applied by means of suitable tools to outer sides of the opposed spacers, so as to crowd them toward each other. This crowding operation causes the arched portions 5—5ª to flatten out and spread, whereby the adjacent balls will be sufficiently embraced by the spacers so that said balls will hold the latter in place, as shown in Fig. 2.

In the drawings we have shown all of the parts 5—5ª as of such length that all of the same are flattened out and spread by mutual contact in the method of assembling, but it is obvious that it is only necessary that a sufficient number be thus formed to guarantee holding the spacers properly in place.

By this very simple method of causing the two spacers to mutually contact at their inner sides during the assembling operation, such spacers may be very quickly and effectively assembled on the balls.

It will be understood further that we have attempted in Fig. 2 to only conventionally represent the final form of the spacer, as the particular shape of the flattened arches 5—5ª may vary somewhat.

We claim:

The method of applying ball spacers to the balls in a double row ball bearing of the unit handling type, comprising forming two separate spacers, each spacer being fluted to form reversely arranged inner and outer arched portions, applying such spacers to the ball bearings with the inner arches confronting each other, then applying pressure to the outside of both of said spacers to crowd them toward each other to simultaneously flatten and spread certain of the adjacent inner arches of the opposed spacers by mutual contact.

PETER COFRANCESCO.
WILLIAM P. THIEDE.